Dec. 26, 1933.  A. D. DOWD  1,941,253
RELAY TESTING APPARATUS
Filed April 30, 1932   2 Sheets-Sheet 2
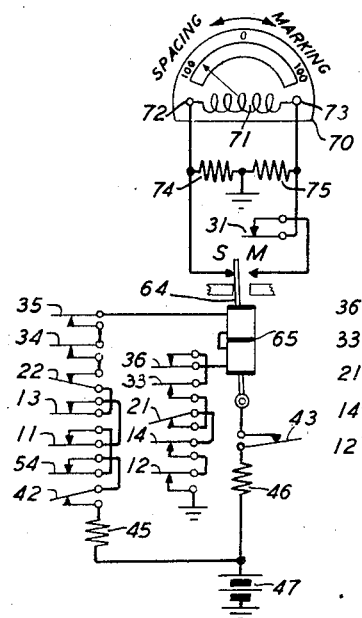
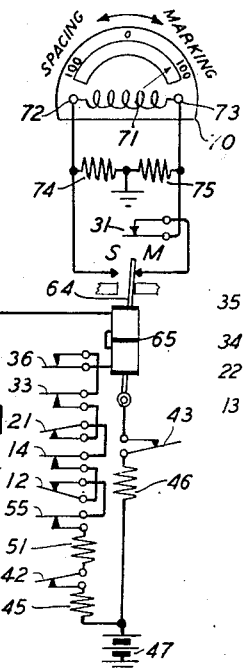
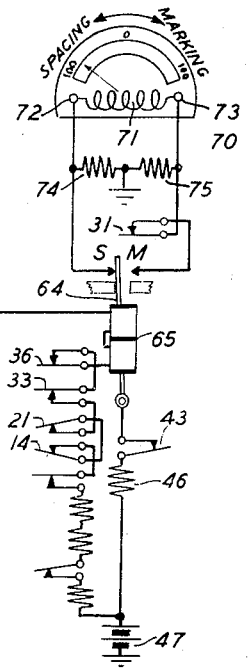
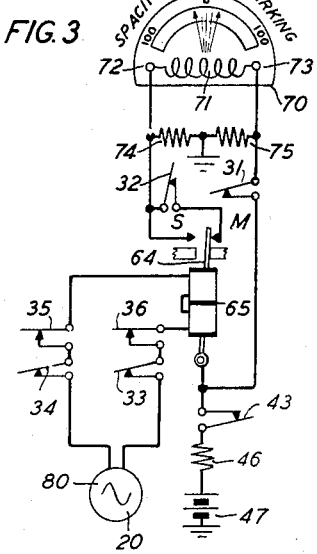
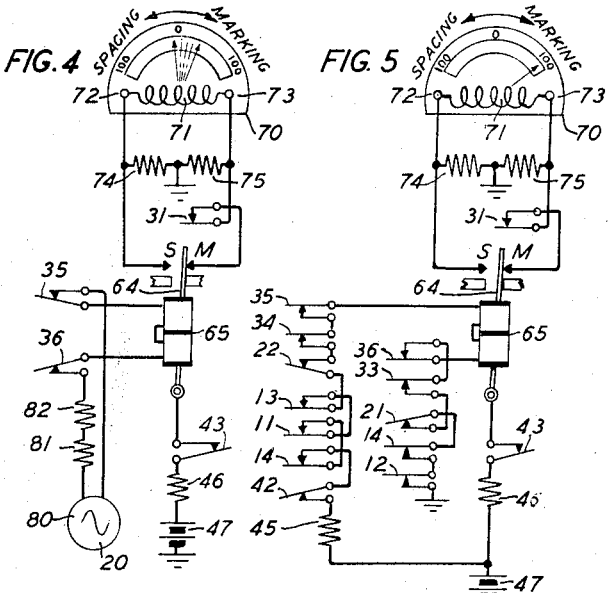
INVENTOR
A. D. DOWD
BY
E. V. Griggs
ATTORNEY Patented Dec. 26, 1933

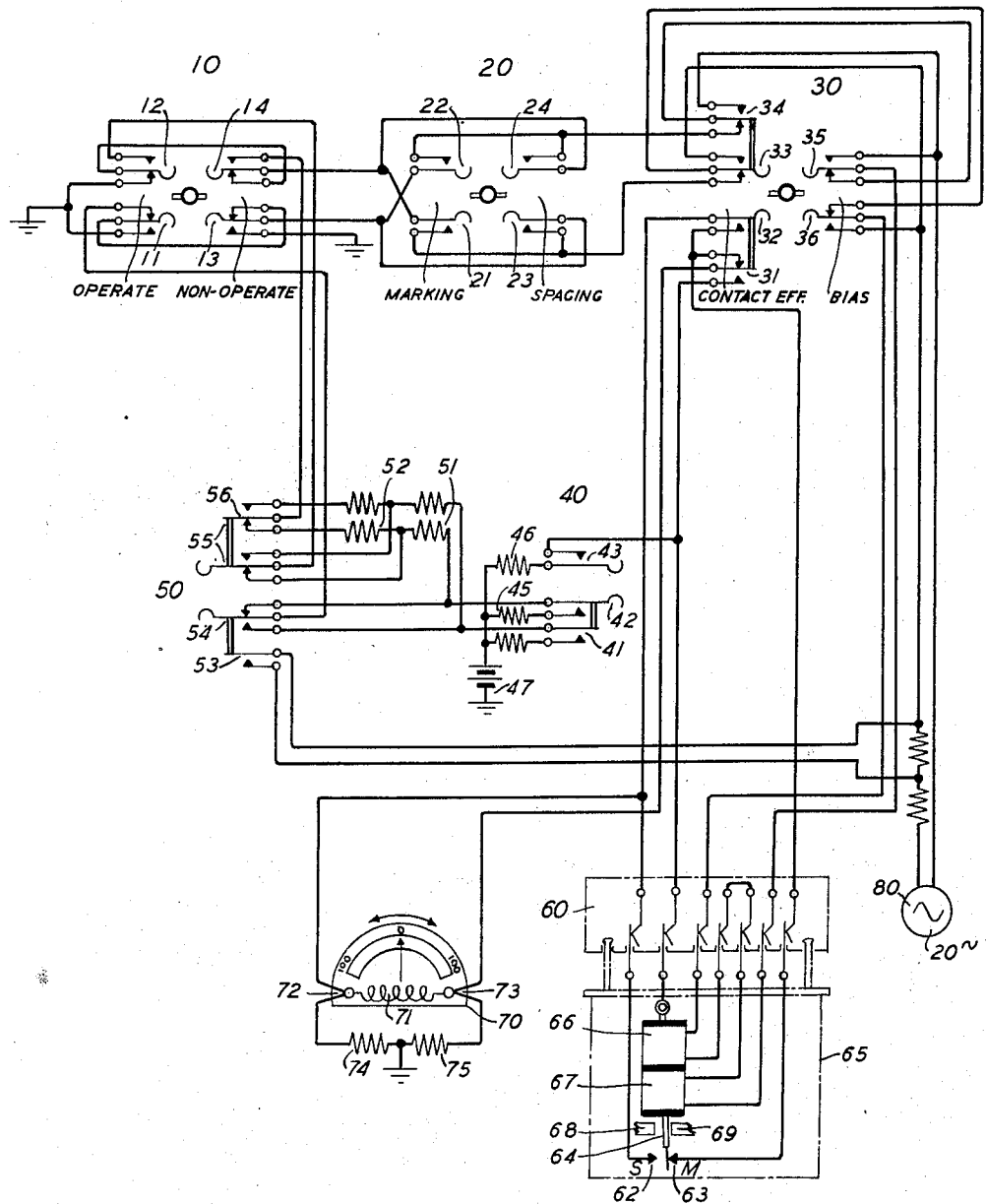

1,941,253

UNITED STATES PATENT OFFICE 1,941,253

RELAY TESTING APPARATUS

Andrew D. Dowd, Montclair, N. J., assignor to Bell Telephone Laboratories, Incorporated, New York, N. Y., a corporation of New York Application April 30, 1932. Serial No. 608,364

5 Claims. (Cl. 175—183)

This invention relates to relay testing circuits and more particularly to circuits for measuring the efficiency of relays.

An object of this invention is to provide a simple circuit arrangement for testing of relays.

A further object is to provide a circuit capable of accurately testing relay efficiency in less time and with greater facility than is attendant upon use of the circuits heretofore employed.

Another object is to readily observe by indications on a meter different operating characteristics of the relay under test.

Telegraph relays require frequent tests and adjustments to maintain a high efficiency of operation. The following tests are usually required: marking and spacing adjustment, which is a test for the preliminary adjustment of the pole pieces, either to avoid that the pole pieces prevent the armature from reaching the contacts, or to avoid that the armature fail to reverse at normal operating current due to the pole pieces being too close to the armature; contact efficiency, to ascertain whether the contacts are clean, whether the contact springs are equally spaced, or whether there is a loose connection in the wiring to the contact springs; biasing adjustment, which is a test to attain a desired bias, or an absence of bias; relay position, a test to determine whether the armature is in the marking or spacing position.

In accordance with the invention, a single circuit is provided which will facilitate the frequent performance of these tests, either in the shop or in the field. The testing arrangement in accordance with the invention includes a meter having the zero point in the center of the scale, and connected for deflecting the needle in opposite directions to a shunt resistance having its middle point grounded. A plurality of switching devices serve to modify the circuit arrangement for the different tests. By means of the double deflection feature of this meter, it is possible to assign one direction of deflection to the marking contact and the other to the spacing contact for any and all of the tests, thereby greatly facilitating the work of adjusting the various parts of the relay to correct for the errors indicated by the meter.

Before proceeding with the several tests, it is customary, first, to examine the relay for loose parts and to tighten them, if any are found.

The relay is inserted in a test panel which will be considered later. The relay and armature contacts should then be cleaned of foreign matter. The pole pieces are then backed off as far as possible so as to eliminate any electrical bias, and it can then be observed whether the armature is poised approximately in the center of the hollow core of the relay. If the armature is not correctly positioned, it can be removed and readjusted so that it will assume the center position when reassembled in the relay. Then the relay contacts are backed off so that the armature will not touch the contacts. With battery applied to the armature, one contact is advanced until it just touches the armature as will be indicated by the deflection on the meter. This contact is then backed off until the distance between it and the armature contact is approximately .002". This operation is repeated with the relay contact on the opposite side of the armature, so that there is a total gap of about .004". With 20 cycle current then applied to the windings, the pole pieces should be advanced alternately until the needle on the meter vibrates steadily at mid-scale.

Referring now to the accompanying drawings:

Fig. 1 is a diagrammatic representation of the test circuit in accordance with a preferred form of the invention.

Figs. 2A, 2B, 2C, 3, 4 and 5 represent in simplified form those parts of the circuit shown in Fig. 1 which are effective in various tests in accordance with different manipulations of the keys.

The circuit, as illustrated in Fig. 1, comprises the keys 10, 20 and 30, which are three-position keys, and the two-position keys 40 and 50 which will be operated in different manners for the different circuit combinations required for various tests. The key 40 for the connection of the battery supply must be closed for all tests, and will be assumed to be closed at all times in the following descriptions. An alternating current source 80 is provided for operation of the relay under test at a frequency approximating the signaling frequency.

The meter 70 has a scale with the zero point in the middle and is adapted to deflect in opposite directions as the current is reversed through its winding. This meter is used for observation in all the tests and the connections are made so that deflections toward right and left, respectively, indicate closure of the marking and spacing contacts on the test relay.

In the preferred form of the invention illustrated in the drawings, the testing circuit is especially adapted for accommodation of a standard type of high speed telegraph relay. Such relays are generally associated with their operating circuits by the insertion of fixed prongs on the base of the relay into corresponding jacks in a connecting block, mounted on the operating panel, from which permanent connections are made to the various circuit devices for normal operation. The test panel for mounting the test circuit and its equipment to which the invention is applied is provided with a similar connecting block for instantaneous insertion of the relay into the test circuit.

As shown in Fig. 1 the standard relay 65, which is to be tested, is inserted by means of prongs into a connecting block 60 which has contact springs corresponding to the prongs of the relay serving to connect the relay to the testing circuit. Upon insertion of the relay into block 60, the relay windings will be connected in series and will remain so for all tests.

The relay for the testing of which the present embodiment of the invention is particularly designed is of the type described in Patent 1,680,667 to A. M. Curtis, issued August 14, 1928. The armature 64 is surrounded by two stationary operating windings 66 and 67 and its free end swings between two adjustable pole pieces 68 and 69 of a low coercivity magnetic system which provides a double return path for the operating fluxes produced by the winding; a permanent magnet has its poles connected to this double magnetic system near the pole pieces thereof to provide a polarized reaction flux; the end of the armature carries a damped contacting member cooperating with stationary adjustable contact points M and S, corresponding to the marking and spacing positions of the armature.

Whereas, Fig. 1 illustrates the complete test circuit, it is believed that a better understanding of the operation of this circuit will be possible by having reference to the simplified diagrams of Figs. 2 to 5 in connection with the following descriptions of the individual tests.

*Test for marking and spacing adjustment*

The object of this test is to facilitate the adjustment of the pole pieces with respect to the armature.

The effective circuits are shown in Figs. 2A, 2B and 2C.

Key 40, as already stated, is normally closed, and for this test key 20 will first be operated to the left or "marking" position. The resulting circuit will be as shown in Fig. 2A.

From this circuit it will readily be observed that battery 47 is applied over resistance 45 and several contacts in series of the various keys to the windings of relay 65; and the circuit may be further traced through the relay windings in series over another group of key contacts to ground. Current flowing in this circuit operates the armature to its spacing contact; resistance 45 is low and the current will be heavier than normal operating current to insure that the armature operates even should the pole piece on marking side be too closely adjusted. For a particular type of relay this "soak current" is .004 ampere.

After this preliminary operation, key 10 is operated to the left or "operate" position and key 20 remains in the "marking" position, whereby the effective circuit will be changed to that shown in Fig. 2B.

It will be observed that the battery and ground connections to the relay windings have been reversed.

The current through the windings has been reduced to normal operating strength by insertion of resistance 51 into the battery circuit. The armature operates to marking position.

With the armature in marking position battery current should be supplied over resistance 46, contact 43 to the armature 64, thence over contact 31, operating winding of meter 70 and resistance 74 to ground; resistance 75 forms a shunt path to ground for the meter. The meter should deflect to "marking", and failure to do so would be an indication that the pole piece on the marking side interferes with the movement of the armature, preventing it from making the "M" contact, and adjustment must be made until a deflection is obtained on the meter.

For the final step in the test, key 20 remains in "marking" position and key 10 is first operated to pass through normal position, thereby reestablishing the circuit shown in Fig. 2A and causing the armature to return to "spacing" position under the influence of the heavy soak current. Key 10 is then moved into "non-operate" position and the effective circuit will be as shown in Fig. 2C.

Battery and ground connections to the relay 65 remain the same as in Fig. 2B but an additional resistance 52 is now in series with the battery circuit thereby reducing the current through the winding to .00029 ampere, a strength below the current required for normal operation.

Under a condition wherein the pole piece on the spacing side is correctly adjusted, the current in the relay winding would not be strong enough to cause the armature to shift to marking position. If, however, the armature should reverse its position to marking, this would indicate that the gap between the armature and the pole piece on the spacing side was too great.

The test for spacing adjustment is similar in all respects to the test for marking adjustment described above, excepting that key 20 when operated is moved to spacing instead of to marking position.

On completion of the test for marking and spacing adjustment keys 10 and 20 are restored to normal as in Fig. 1.

*Contact efficiency*

In this test the object is to learn whether the contacts are efficient and free from dirt.

The effective circuit for the contact efficiency test is shown in Fig. 3, and is obtained by closing key 40 and operating key 30 to the left or contact efficiency side.

By the operation of key 30 an alternating current source 80 is connected to the windings of relay 65. The armature vibrating in accordance with the frequency of the source 80 will oscillate between relay contacts S and M. Battery current is continuously supplied through resistance 46, contacts 43 and 31, operating winding of meter 70 and resistance 74 to ground; resistance 75 forms a shunt path to ground for the meter. The meter deflects to marking. Battery current through resistance 46 and contact 43 is also supplied to the armature 64. When the armature actually engages either contact S or M equal potentials will be applied to both terminals of the meter, and the meter needle will remain on zero. Immediately after the armature breaks contact, current will again flow through the meter winding since the battery is continuously connected to meter terminal 73 and the meter needle will then be deflected toward the marking side.

With the armature oscillating at a frequency corresponding to the alternating current source 80, the interruptions of the battery current at the contacts S and M will control the degree of deflection of the needle.

For minimum requirements of contact efficiency a standard deflection on the meter is prescribed for the test. That deflection is small when the contacts are clean, and is occasioned by substantially no current flowing through the meter, a larger deflection of the meter indicating poor contact or poor connections to the contact members. By this provision, fluctuation in the voltage of the local current source need not be taken into consideration in the readings or be safeguarded against.

If, after cleaning the contacts a repetition of the test reveals an unsatisfactory condition by a deflection of the meter needle greater than the acceptable maximum deflection, other defects may be the cause, such as, unsymmetrical adjustment of the contacts with respect to the armature or a loose connection in the wiring to the relay.

The successful removal of such defects may be observed by repeating this test.

*Bias test*

The bias test is for the purpose of facilitating adjustment of the pole pieces to eliminate bias.

The effective circuit for this test is shown in Fig. 4. Key 40 is closed and key 30 is operated to the right or bias side.

In this circuit the relay windings are connected to the alternating current source 80 over a path traced through resistances 81 and 82 and spring contacts 35 and 36. Current is supplied to the armature through resistance 46 and contact 43.

The armature vibrating in accordance with the frequency of the alternating current source 80 will oscillate between the marking and spacing contacts, and the meter needle will deflect alternately to right and left forming an image before the scale.

Assuming that the pole pieces have been given their preliminary adjustment and that the contacts have been made efficient as observed by the tests already described there may still be a lack of symmetry in the pole adjustment and in the contact conditions which would be the cause of an undesirable bias. This bias is apparent from an unsymmetrical disposition of the needle image with respect to zero in the meter, and may be compensated for, irrespective of its cause by adjustment of both pole pieces until the image becomes centered on the meter scale.

*Relay position*

The object of the relay position test is to learn whether the armature is in marking or spacing position.

Fig. 5 shows the circuit for this test.

Key 40 is closed. Key 20, normally open, is during the test operated first to one side and then to the other side. While key 20 is normally open the needle on meter 70 will remain on zero.

In this circuit the battery is connected through resistance 45 and several contacts in series of the various keys to the windings of relay 65; the circuit continuing through the relay windings in series over another group of key contacts to ground. Under the conditions shown in Fig. 5, key 20 is operated to the left or marking side and the armature would swing to the M contact. Current is then supplied via resistance 46, contact 43 to the armature 64, thence over contact 31 to the winding of meter 70 causing the meter needle to deflect to the marking side. By reversing key 20 to the right or spacing position a reversal of current in the relay windings may be effected whereby the armature is operated to spacing position which in turn is indicated on the meter.

What is claimed is:
1. A relay testing apparatus comprising a meter, a source of current, contact means for insertion of a relay having an operating winding and contacts in circuit with said meter and source, and switching means to enable alternative circuit conditions to be set up whereby tests may be successively made for bias adjustment and contact efficiency respectively of said relay.

2. A circuit for testing relays comprising an indicating device, a winding for said device, a source of direct current, a resistance connected in shunt of said winding, the center point of said resistance being connected to one pole of said direct current source, a connecting block associated with said circuit having apertures for receiving the prongs of the relay to be tested, periodic current means for vibrating the relay to be tested, and circuit means for causing a flow of current through the winding of said indicating device with a consequent visible indication on said device whenever the armature and contacts of the relay being vibrated touch one another and at no other time.

3. A circuit for testing the contact efficiency of relays comprising an indicating device, a winding for said device, a source of direct current, a resistance connected in shunt of said winding, a point intermediate the terminals of said resistance being connected to one pole of said direct current source, a connecting block associated with said circuit having apertures for receiving the prongs of the relays to be tested, periodic current means for vibrating the relay to be tested, and circuit means for causing a flow of current through the winding of said indicating device with a consequent visible indication on said device whenever the contacts of the relay being vibrated do not touch one another or make poor contact due to troubles such as dirty or defective contacts, poor adjustment and the like.

4. A measuring circuit for testing a vibrating relay having an armature alternately touching opposite contacts of the relay comprising a sensitive indicating device having an actuating winding with two terminals, a source of current, a resistance connected in shunt of the winding of said indicating device, a point intermediate the terminals of said resistance being connected to one pole of said source of current, a conductor for connecting the armature of said relay to the other pole of said source of current and leads for separately connecting the terminals of the winding of said indicating device to said opposite contacts.

5. A circuit for testing relays having an armature and a pair of contact members, comprising a meter having a winding, with two terminals, a direct current source, a symmetrical connection from said winding to said source, a direct circuit connection from said source to one terminal of said meter, a direct circuit connection from said source through the armature and alternate contacts of said relay to the other terminal of said meter to produce a zero current condition in said meter winding, and an alternating current source connected to the relay winding to supply current to oscillate said armature between said alternate contacts at the frequency of said alternating current to disturb the zero current condition in said meter winding in accordance with the contacting condition between said armature and said alternate contacts.

ANDREW D. DOWD.